(12) United States Patent
Condeixa et al.

(10) Patent No.: US 10,462,689 B2
(45) Date of Patent: Oct. 29, 2019

(54) SYSTEMS AND METHODS FOR MONITORING A NETWORK OF MOVING THINGS

(71) Applicant: Veniam, Inc., Mountain View, CA (US)

(72) Inventors: Tiago Condeixa, Aveiro (PT); Henrique Cabral, Matosinhos (PT); Ricardo Matos, Oporto (PT); Rui Costa, Sintra (PT); Diogo Carreira, Pombal (PT)

(73) Assignee: Veniam, Inc., Mountain View, CA (US)

( * ) Notice: Subject to any disclaimer, the term of this patent is extended or adjusted under 35 U.S.C. 154(b) by 260 days.

(21) Appl. No.: 15/174,638

(22) Filed: Jun. 6, 2016

(65) Prior Publication Data

US 2017/0085437 A1 Mar. 23, 2017

Related U.S. Application Data

(60) Provisional application No. 62/222,066, filed on Sep. 22, 2015, provisional application No. 62/222,168, (Continued)

(51) Int. Cl.
| | |
|---|---|
| *H04L 12/24* | (2006.01) |
| *H04W 24/08* | (2009.01) |
| *H04L 12/26* | (2006.01) |
| *H04W 4/02* | (2018.01) |
| *H04W 24/10* | (2009.01) |

(Continued)

(52) U.S. Cl.
CPC ............. *H04W 24/08* (2013.01); *H04L 43/06* (2013.01); *H04L 43/0817* (2013.01); *H04W 4/02* (2013.01); *H04W 24/10* (2013.01); *H04W 4/027* (2013.01); *H04W 4/046* (2013.01); *H04W 4/80* (2018.02); *H04W 4/90* (2018.02); *H04W 24/06* (2013.01)

(58) Field of Classification Search
CPC ..... H04W 24/06; H04W 24/08; H04W 24/10; H04W 84/005; H04W 4/046; H04W 4/70; H04W 88/08; H04W 4/027; H04W 48/18; H04W 4/80; H04W 84/06; H04W 88/10; H04W 36/0055; H04W 48/08; H04W 48/16; H04W 8/20; H04L 12/1836; H04L 67/12; H04L 43/06; H04L 2209/80; G06Q 10/0833; G06Q 50/28; G08G 1/205

See application file for complete search history.

(56) References Cited

U.S. PATENT DOCUMENTS

| | | | |
|---|---|---|---|
| 7,020,701 B1 * | 3/2006 | Gelvin | .................. G01D 21/00 |
| | | | 250/332 |
| 2005/0065711 A1 * | 3/2005 | Dahlgren | ............... G07C 5/008 |
| | | | 701/117 |

(Continued)

*Primary Examiner* — Jason D Recek
*Assistant Examiner* — Ranjan Pant
(74) *Attorney, Agent, or Firm* — McAndrews, Held & Malloy, Ltd.

(57) ABSTRACT

Systems and methods for monitoring a network of moving things. As non-limiting examples, various aspects of this disclosure provide configurable systems and methods for monitoring various operational characteristics of a network of moving things, determining a reporting strategy for the monitored characteristics, and/or implementing the determined reporting strategy.

11 Claims, 13 Drawing Sheets

Related U.S. Application Data filed on Sep. 22, 2015, provisional application No. 62/246,372, filed on Oct. 26, 2015.

(51) Int. Cl.
*H04W 4/90* (2018.01)
*H04W 4/80* (2018.01)
*H04W 4/04* (2009.01)
*H04W 24/06* (2009.01)

(56) References Cited

U.S. PATENT DOCUMENTS

| | | | | |
|---|---|---|---|---|
| 2010/0177650 A1* | 7/2010 | Wittgreffe | ........ | H04J 3/14 370/252 |
| 2011/0099257 A1* | 4/2011 | Narin | ........ | H04L 41/0686 709/221 |
| 2012/0086552 A1* | 4/2012 | Fast | ........ | G01S 5/0018 340/8.1 |
| 2013/0114446 A1* | 5/2013 | Liu | ........ | H04W 24/10 370/252 |
| 2013/0274986 A1* | 10/2013 | Trepagnier | ........ | G01S 17/023 701/26 |
| 2014/0133333 A1* | 5/2014 | Liu | ........ | H04W 24/10 370/252 |
| 2014/0293824 A1* | 10/2014 | Castro Castro | ........ | H04L 41/142 370/252 |
| 2015/0061895 A1* | 3/2015 | Ricci | ........ | H04W 4/90 340/902 |
| 2016/0116293 A1* | 4/2016 | Grover | ........ | G01C 21/34 701/23 |
| 2018/0075538 A1* | 3/2018 | Konrardy | ........ | G06Q 40/08 |
| 2019/0090174 A1 | 3/2019 | Rocci et al. | | |

* cited by examiner

SYSTEMS AND METHODS FOR MONITORING A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Application Ser. No. 62/222,066, titled "Systems and Methods for Monitoring a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; and U.S. Provisional Application Ser. No. 62/246,372, titled "Systems and Methods for Probing and Validating Communication in a Network of Moving Things", filed on Oct. 26, 2015; each of which is hereby incorporated herein by reference in its entirety.

The present application is also related to U.S. Provisional Patent Application Ser. No. 62/222,192, titled "Communication Network of Moving Things," filed on Sep. 22, 2015; U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately monitor and/or support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
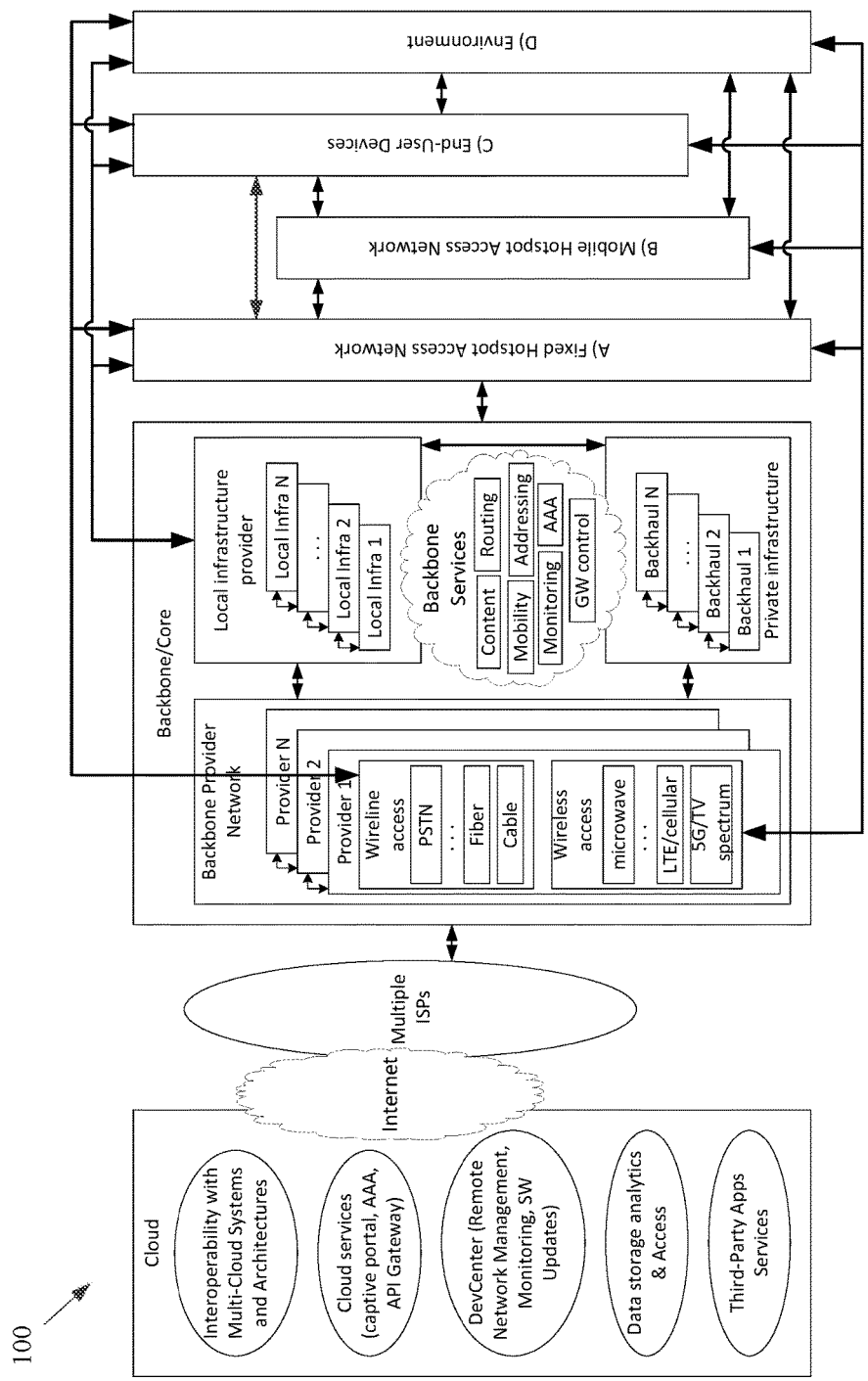
FIG. 1 shows a block diagram of a communication network, in accordance with various aspects of this disclosure.

Various aspects of this disclosure provide systems and methods for monitoring a network of moving things. As non-limiting examples, various aspects of this disclosure provide configurable systems and methods for monitoring various operational characteristics of a network of moving things, determining a reporting strategy for the monitored characteristics, and/or implementing the determined reporting strategy.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the Cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a Cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, 600, 700, 800, 900, 1000, and 1100 discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-Cloud systems and architectures. Another example component (e.g., a Cloud service component) may, for example, provide various Cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
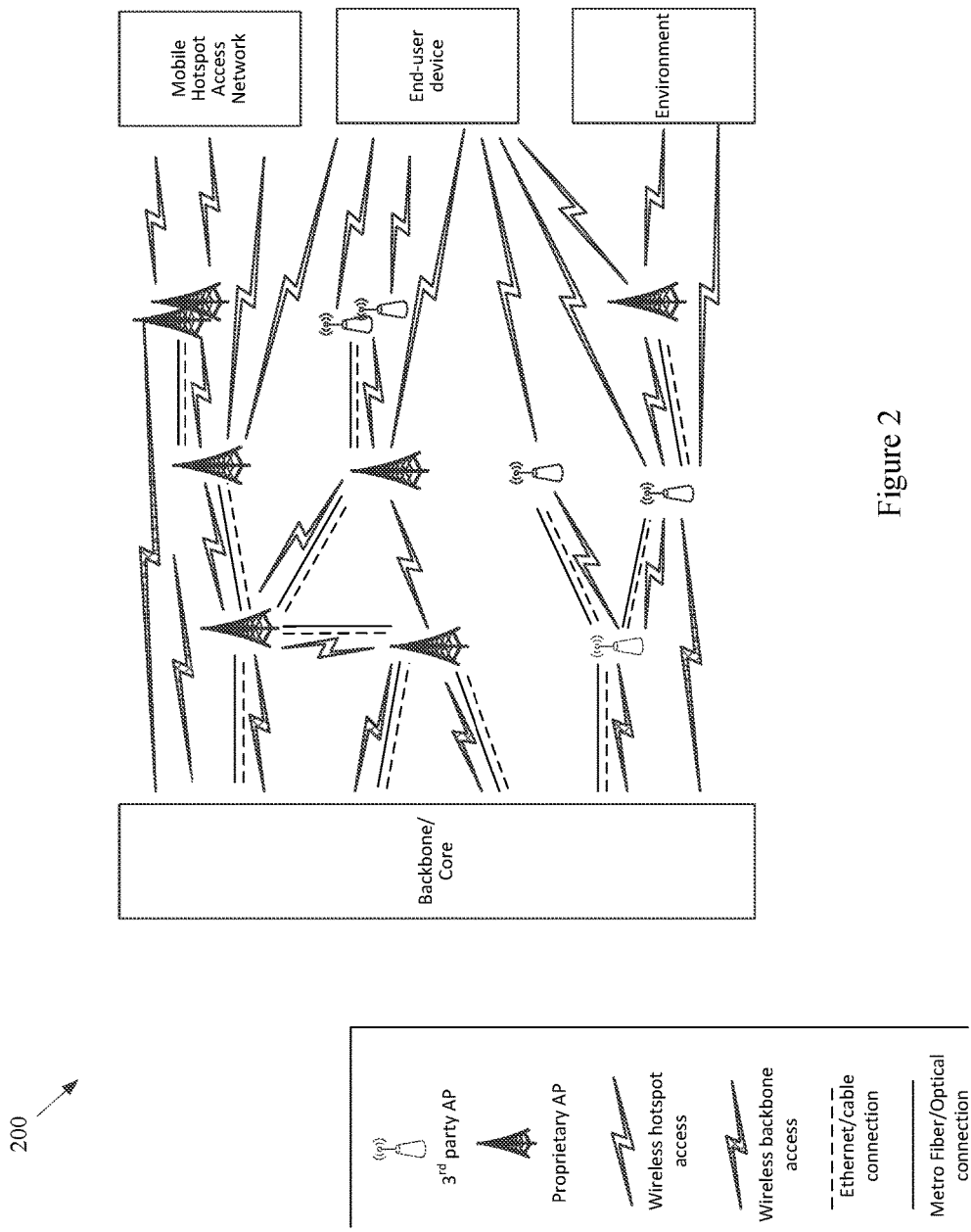
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, 600, 700, 800, 900, 1000, and 1100, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
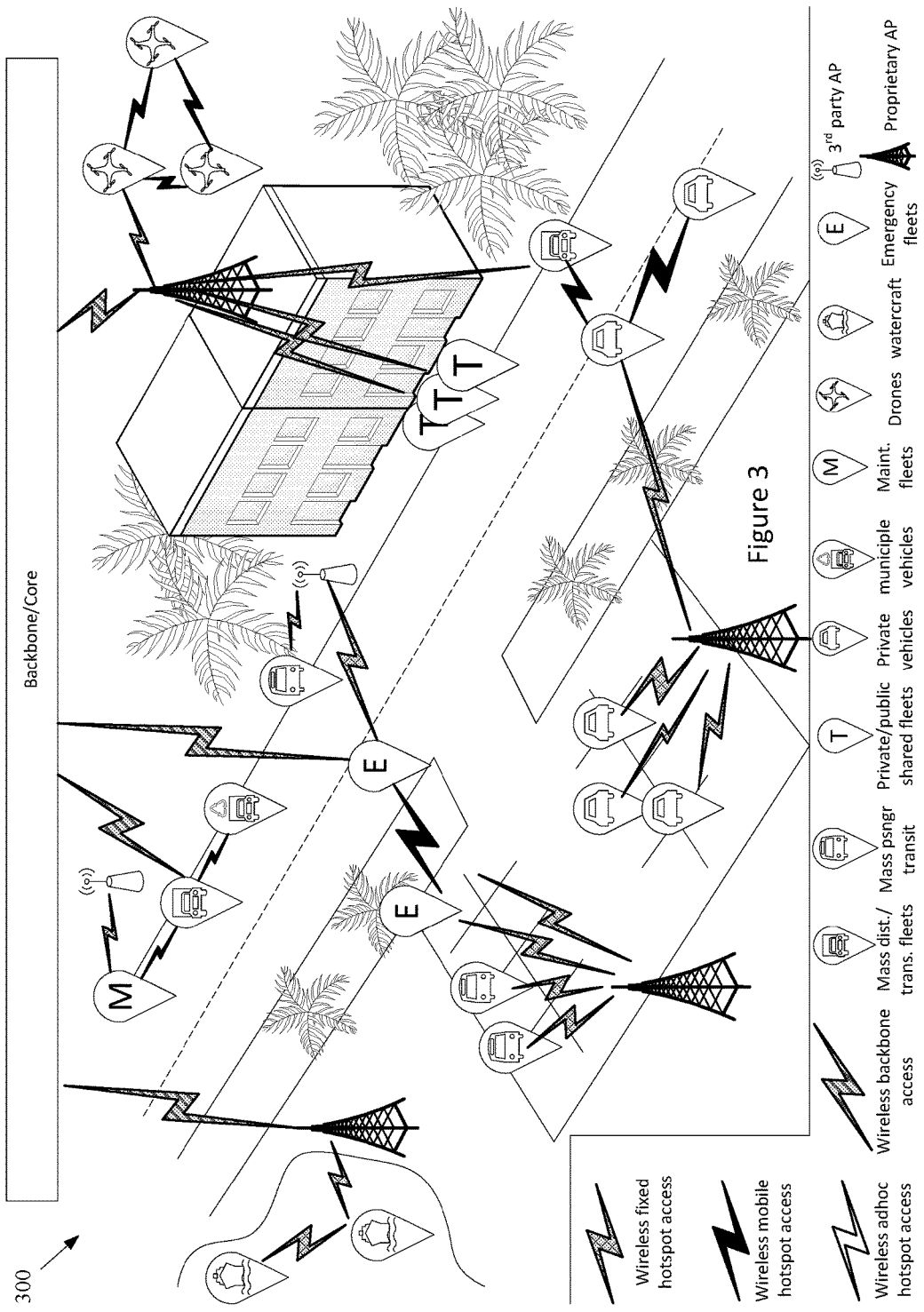
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, 600, 700, 800, 900, 1000, and 1100 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
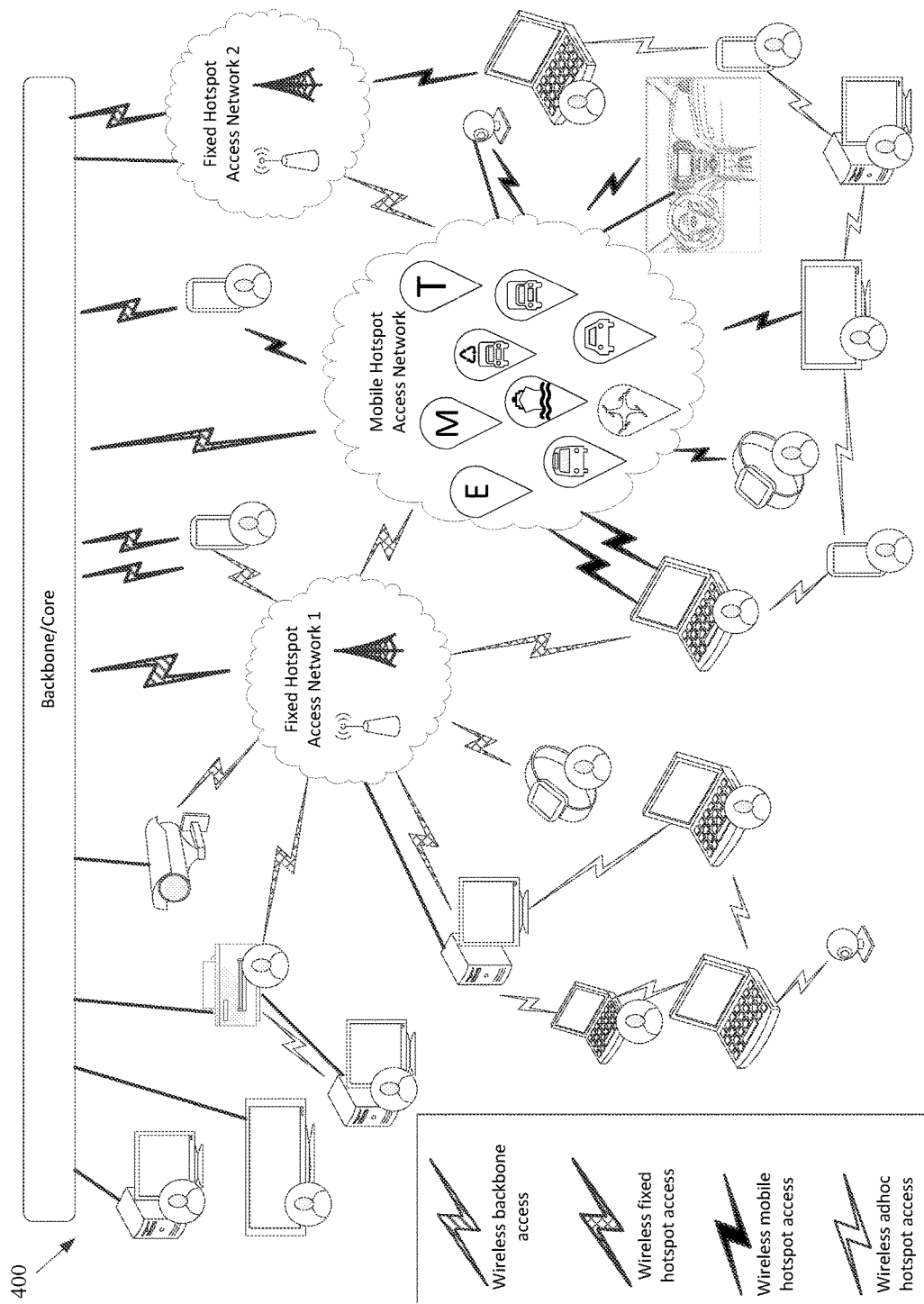
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, 600, 700, 800, 900, 1000, and 1100, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
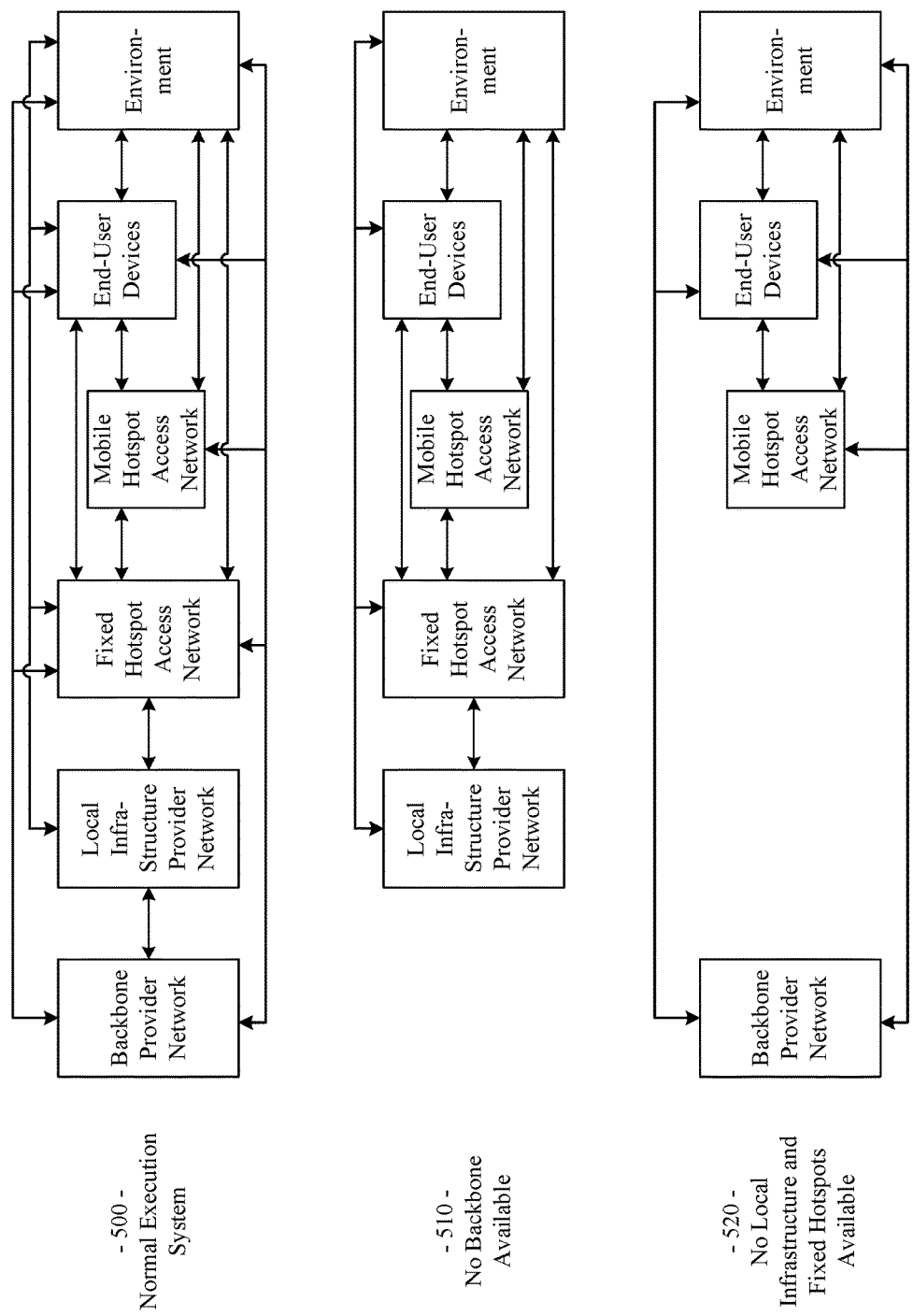
FIGS. 5A-5C show a plurality of network configurations illustrating the flexibility and/or and resiliency of a communication network, in accordance with various aspects of this disclosure.
Figure 5B:
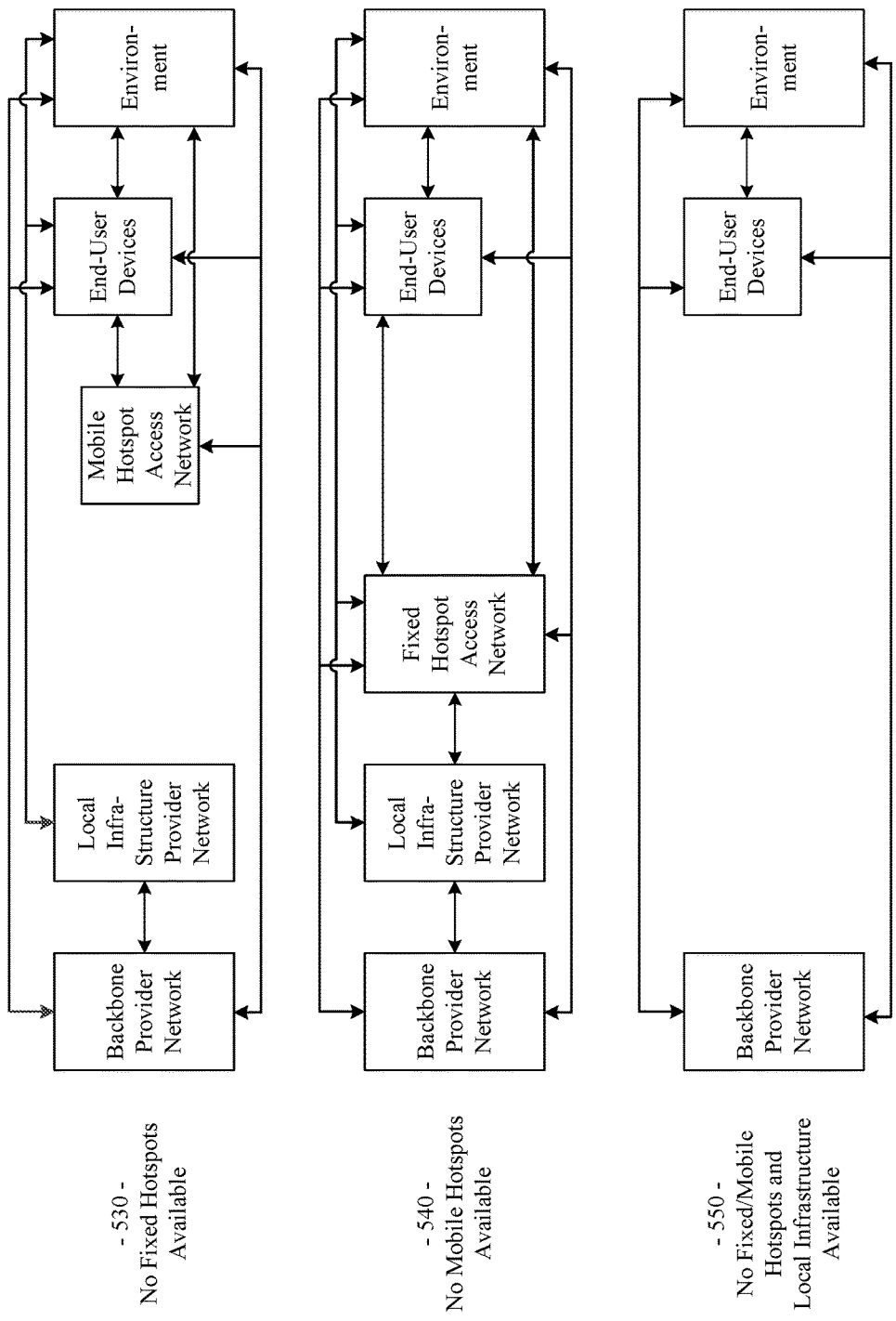
Figure 5C:
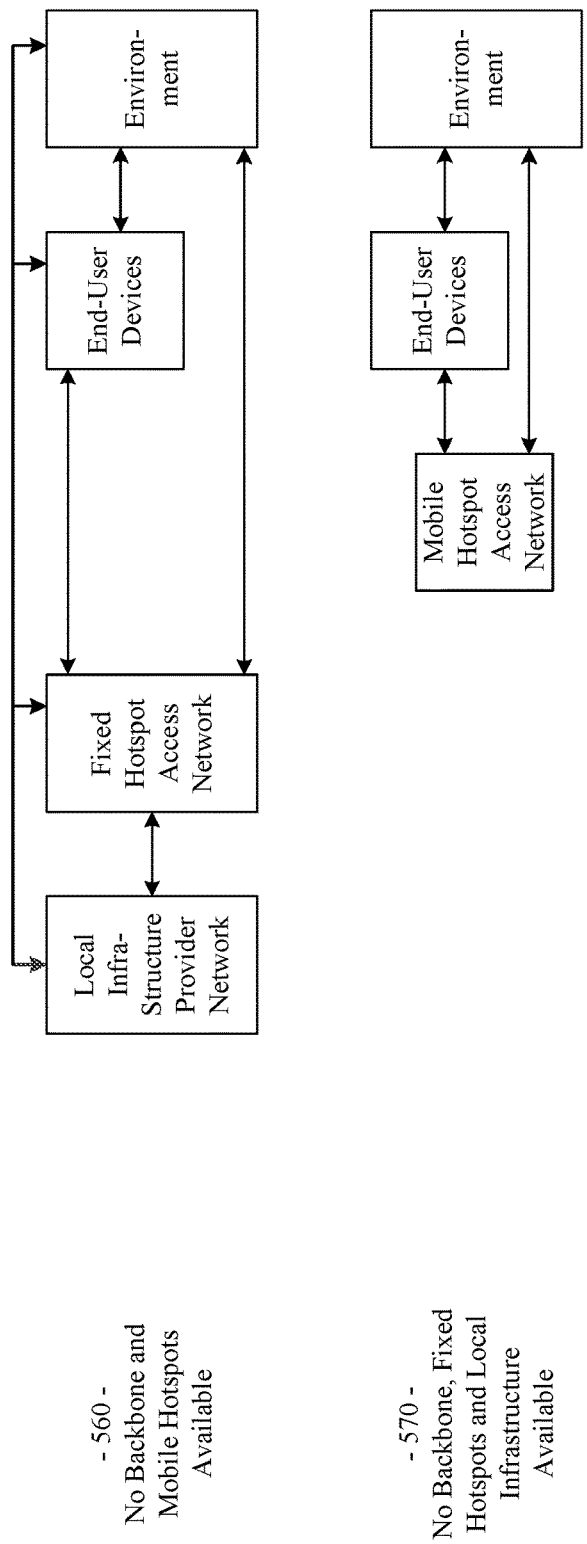

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, 600, 700, 800, 900, 1000, and 1100, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of Cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
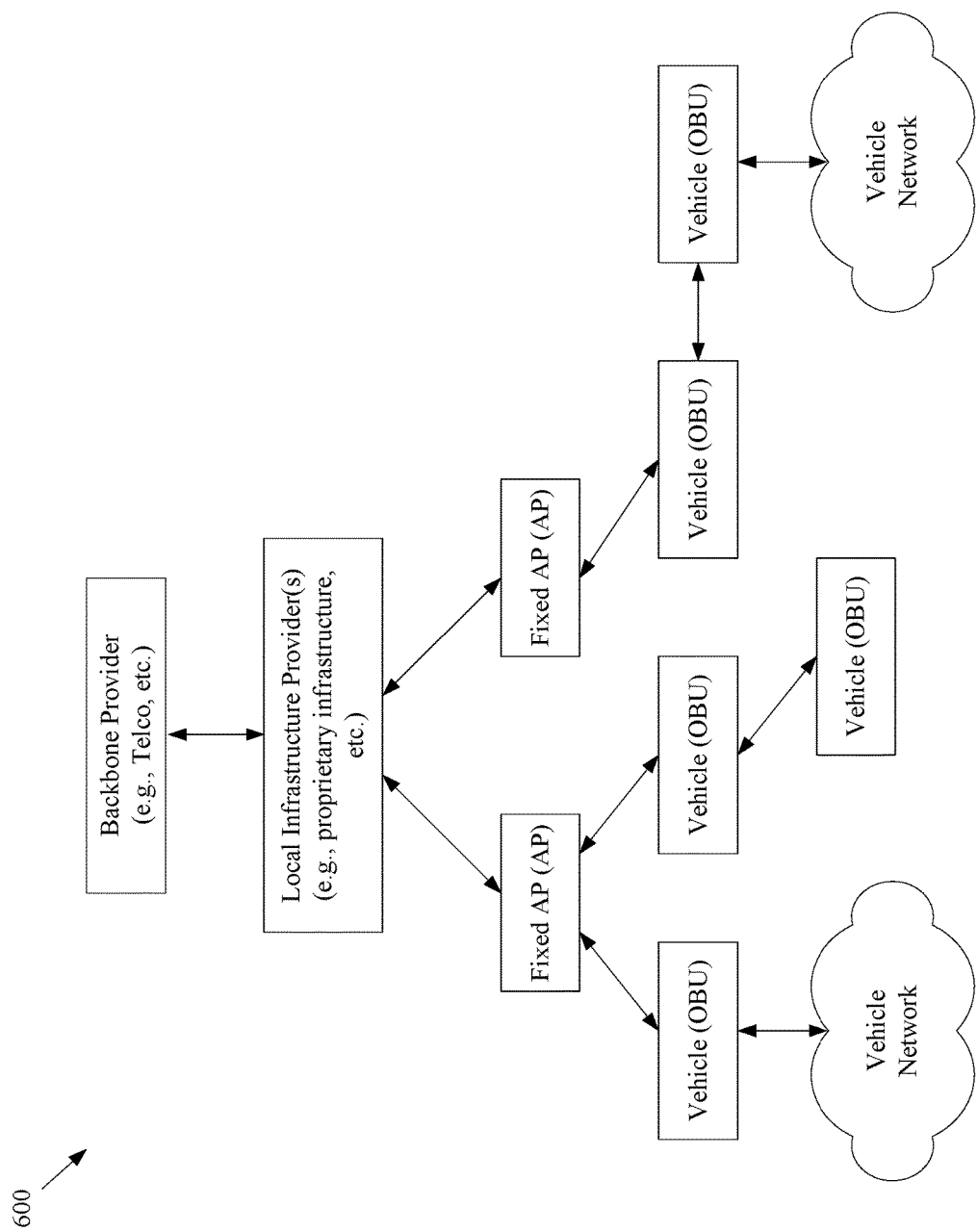
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, 500-570, 700, 800, 900, 1000, and 1100, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

A network of moving things may, for example, comprise a large network of diverse devices, for example comprising Cloud infrastructure, backbone infrastructure, fixed access point nodes, mobile access point nodes, user devices, sensors, etc. In such a large, diverse, and dynamic network, information regarding the performance of any or all of the different processes involved (e.g., database queries, Network Operations Controller (NOC) access, connection establishment, cellular connection recovery, Internet/Intranet access, Mobile AP wakeup after movement, S/W updates, configuration updates, eco-mode configuration, entire fleet update, time connected through various networks or technologies (e.g., 802.11p, cellular, Wi-Fi, etc.), handover or handoff (HO) time, number of handoffs, etc.) may be utilized for any of a large variety of purposes (e.g., network management, configuration management, resource allocation, message routing, software distribution, city and/or fleet management, traffic and/or vehicle control, etc.).

Additionally, network monitoring may, for example, facilitate the understanding of system bottlenecks, limitations, and failure points, and also provide a mechanism for experimenting with and/or comparing different networking strategies. Further, network monitoring may facilitate early detection of algorithm issues, coding errors, system failures, system intrusions and attacks, etc., providing for early correction.

In accordance with various aspects of this disclosure, any of a large variety of characteristics (non-limiting examples of which are provided herein) may be monitored or measured and reported, for example during day-to-day operation of the network. In addition, characteristics of the measurements (e.g., measurement or message timing (e.g., scheduling, triggers, periodicity, etc.), number of measurements, measurement resolution, measurement triggers, types of measurements, etc.) may be configurable, for example locally at a node, by a central controller in the Cloud, by a client's dashboard, etc.

Additionally, in accordance with various aspects of this disclosure, measurement information and/or metrics calculated therefrom may be communicated through the network (e.g., to the Cloud, to a client site, to a network controller, etc.) in accordance with the urgency with which such information is needed. For example, the information may be communicated in real-time as needed and/or the information may be communicated utilizing a delay-tolerant protocol (e.g., DTN protocol, etc.). Such flexibility may, for example, provide for optimization of operational cost and/or network operation. One or more databases (e.g., in the Cloud, at a client site, etc.) may then be utilized to store and/or provide access to the information as needed and/or as authorized.

A system and/or method in accordance with various aspects of this disclosure may be implemented and/or enabled in any network device (or node) in which measurement or monitoring information is desired. The measurements or monitoring activities may, for example, be node-type dependent, user dependent, process dependent, network configuration dependent, etc. For example, each process may be associated with a respective set of measurements and/or metrics calculated therefrom.

In an example implementation, a node or probe and/or related device may perform measurements and/or make measurement decisions autonomously, but may also perform measurements and/or make measurement decisions in accordance with a configuration that may be updated from the Cloud. For example, a central controller (e.g., a network operations center, a client server, etc.) may download measurement configuration information to any node in the network. Such configuration information may, for example for each measurement (or monitoring activity) that a node is capable of performing, specify the manner in which the measurement is to be performed (e.g., the times, periodicity, triggering events, resolution, message filtering information, messages to capture, message sources to monitor, message destinations to monitor, etc.), the manner in which metrics based on the measurements are to be performed, the manner in which the measurement information is to be communicated back to the Cloud and/or distributed to other network nodes, time constraints and/or an indication of urgency for the measurement information, etc. The configuration for each node or probe may be modified flexibly at any time.

In an example scenario in which triggers are utilized to control various aspects of network monitoring or measurement, such triggers may comprise any of a variety of characteristics. For example, triggers may be based on networking events identified, instigated and/or reported by any of a variety of processes operating in a network node. For example, an indication of a handover event may be communicated by publishing or otherwise distributing a message indicating that a handover event is imminent or likely. Also for example, an indication of a network reconfiguration, for example a Mobile AP (e.g., an OBU, etc.) changing association (or handing over) between Fixed and/or Mobile APs, may be indicated by any node participating in such operation.

As discussed herein, various collected measurements or metrics may be associated with a respective urgency (or priority). For example, a measurement configuration profile may include an indication of urgency for a measurement or metric. Such an indication of urgency may, for example, indicate whether the measurement should be sent up through the network in real-time in a fastest known connection, whether the measurement should be delivered in a flexible manner (e.g., using a delay tolerant network (DTN) protocol, etc.) but within a maximum time window, whether the measurement should be delivered using a cheapest communication mechanism available, etc. A node may then, for example upon obtaining the measurement or calculating the metric, communicate the relevant information in the appropriate manner.

Figure 7:
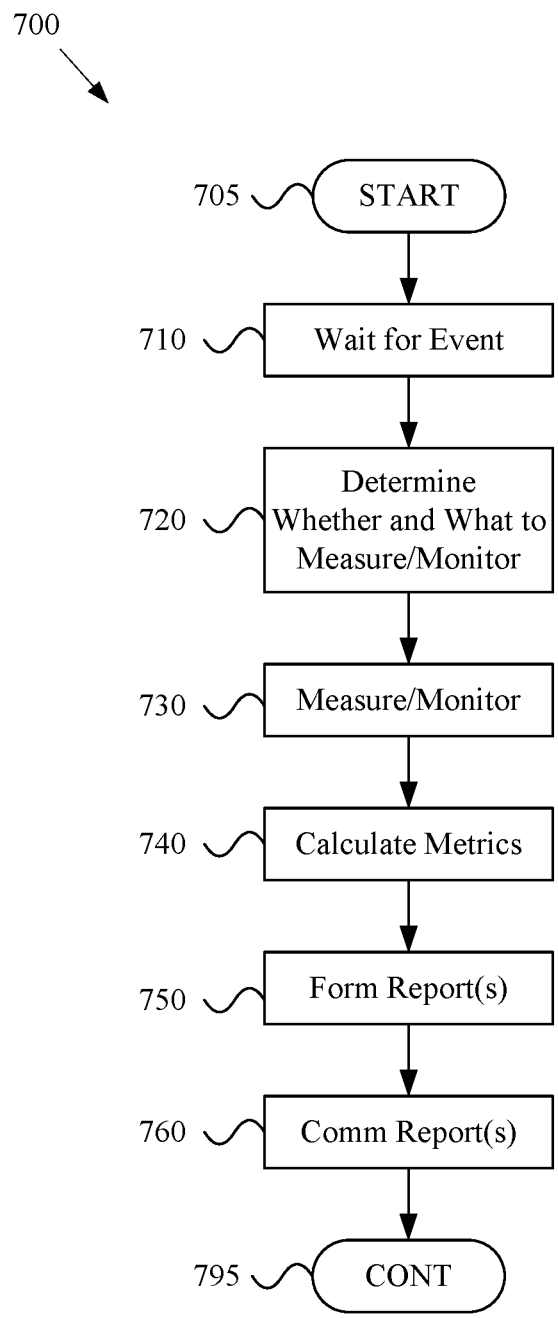
FIG. 7 shows a flow diagram of an example method and system for monitoring network behavior, in accordance with various aspects of the present disclosure.
Figure 8:
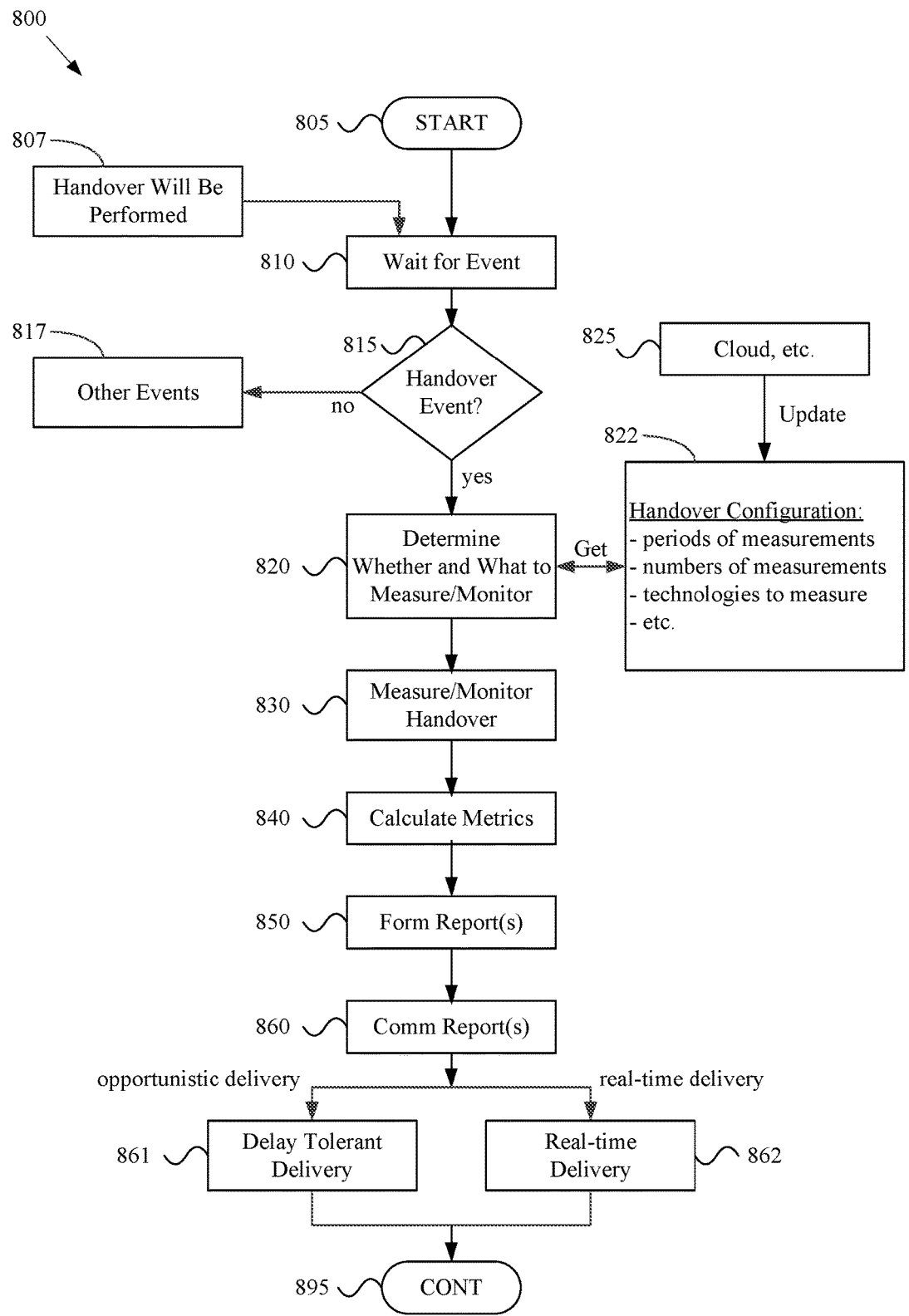
FIG. 8 shows a flow diagram of an example method and system for monitoring network behavior, in accordance with various aspects of the present disclosure.

Various aspects of the present disclosure will now be presented in the context of particular examples. FIGS. 7 and 8 will be discussed together, for example showing various general aspects of the present disclosure with reference to FIG. 7, and reinforcing such general aspects by showing various specific example aspects with reference to FIG. 8.

FIG. 7 shows a flow diagram of an example method and system for monitoring network behavior, in accordance with various aspects of the present disclosure. The example method 700 and system may, for example, share any or all characteristics with the other example methods, networks and/or network components 100, 200, 300, 400, 500-570, 600, 800, 900, 1000, and 1100, discussed herein.

FIG. 8 shows a flow diagram of an example method and system for monitoring network behavior, in accordance with various aspects of the present disclosure. The example method 800 and system may, for example, share any or all characteristics with the other example methods, networks and/or network components 100, 200, 300, 400, 500-570, 600, 700, 900, 1000, and 1100, discussed herein. As discussed above, the example method 800 provides, among other things, specific example aspects comprising the monitoring/measurement of various characteristics of a handover event. It should be understood that the handover example is non-limiting and that the aspects of the handover example are readily extendible to the monitoring/measurement of any of a variety of network operations.

The example method 700 begins executing at block 705. The example method 700 may begin executing in response to any of a variety of causes or conditions. For example, the example method 700 may generally continually execute, for example in response to powering up, rebooting, or resetting one or more nodes of the network and/or a Network Probe, etc. Also for example, the example method 700 may begin executing in response to a user command (e.g., an end-user request, a command from network management personnel or a field technician, a service provider request, a fleet manager request, etc.). Additionally for example, the example method 700 may begin executing in response to one or more metric measurements performed automatically by the system (e.g., a vehicle context measurement, node or path throughput measurement, channel quality measurement, error rate measurement, neighbor node assessment, added or dropped link, user count or loading measurement, node-generated error or warning message, information received from a public service node (e.g., public service announcements, warning and alerts, etc.), command originating at a Cloud source or server, etc. Also for example, the example method 700 may be initiated periodically (e.g., at timed intervals, consistent and/or inconsistent timed intervals, etc.). In general, the example method 700 may execute in response to any of a variety of causes or conditions. Accordingly, the scope of this disclosure should not be limited by characteristics of any particular initiating cause or condition. Block 805 of the example method 800 may, for example, share any or all aspects with block 705.

The example method 700 may, at block 710, comprise waiting for an event (or indication thereof). The event (or network operation) may comprise any of a variety of characteristics. For example, the event may be a timer signal, a command or configuration update received from another node (e.g., from a peer node, from a higher-level node in the infrastructure, from an application running on a network server, from a client dashboard, from a node being monitored by a Network Probe, etc.), a physical event detected by a sensor (e.g., an environmental sensor, inertial sensor, security sensor, camera sensor, microphone sensor, etc.), an identified location or region, a communication loading level threshold being exceeded, a threshold number of users being detected, etc. For example, the event may comprise any or all aspects of vehicle context (e.g., vehicle speed and/or trajectory, location, density of vehicles or Mobile APs, availability of Fixed APs and/or other Mobile APs, fleet of which a vehicle is a part, etc.).

In the particular example flow 800 shown in FIG. 8, at block 810, a message or other triggering signal is received from block 807 (e.g., from the node being monitored, etc.) that a handover (or network reconfiguration) is going to be performed, is likely to be performed, etc.

At block 710, the example method 700 may, for example, comprise analyzing the identification of the event and/or any of a variety of types of information describing particular characteristics of the event to determine how to handle the detected event. Though not shown graphically in FIG. 7, an example is provided in FIG. 8 at block 815, which directs execution flow of the example method 800 to block 817 (representing respective network monitoring/measuring flows for events other than a handover event). Block 815 directs execution flow of the example method 800 to block 820 if it is determined that the event detected at block 810 corresponds to a handover event.

At block 720, the example flow 700 determines whether and/or how various characteristics of the event are to be measured (e.g., determining measuring/monitoring strategy). For example, block 720 may comprise analyzing configuration information received from another node (e.g., a node being monitored, a Cloud server, a network controller, a network operations center, etc.) to determine a measuring or monitoring strategy. Such configuration information may, for example, be passively received and/or may be actively solicited or retrieved by a Network Probe. In an example implementation, the configuration information may be downloaded via a different communication network and/or communication pathway than that associated with the monitoring activity.

Such configuration information may comprise any of a variety of characteristics. For example, the configuration information may comprise information indicating the beginning and end of a measurement period (e.g., beginning and ending times, events, messages, locations, etc.), information indicating a duration of monitoring/measuring activity, etc. The configuration information may comprise information indicating a number of measurements to perform, information indicating what is to be measured (e.g., signal characteristics, etc.), information indicating what messages (e.g., messages external to the node and/or internal to the node) are to be monitored or captured, information indicating source(s) and/or destination(s) of signals to be measured and/or messages to be monitored or captured, information indicating technologies (e.g., signal technologies, sensor technologies, etc.) to measure, information indicating a resolution at which a measurement is to be made, information indicating a periodicity of a periodic measurement or measurement cycle, information defining reports that are to be formed and/or communicated to a destination, information indicating an urgency of a reporting message (e.g., for all reports or for each report independently, communicate in real-time as fast as possible, communicate in an opportunity delay-tolerant manner, communicates in a cheapest way, etc.).

The configuration information may also, for example, comprise information indicating metrics that the Network Probe is to calculate. For example, the configuration information may comprise information indicating that the Network Probe is to measure (or estimate) the time it takes to perform a network operation (e.g., a handover, a sensor data acquisition operation, a client session, etc.), determine whether an operation was successful or not, calculate an overall data rate, calculate an average error rate or packet retransmission rate, calculate a number of active users, etc.

The configuration information may also, for example, comprise information describing one or more reporting messages that the Network Probe is to communicate. For example, the configuration information may comprise information identifying a reporting message data structure (e.g., identifying fields and field lengths, etc.) that the Network Probe is to utilize when communicating monitoring/measuring results to a destination. The configuration information may also, for example, comprise information indicating one or more destinations for such reporting messages.

Block 720 may, for example, comprise determining monitoring (or measuring) strategy in real-time when triggered by an event or likely event. Block 720 may also, for example, comprise determining the measuring (or monitoring) strategy periodically, when a configuration update is detected, etc.

As a specific example, as shown in the example method 800 of FIG. 8, an application executing in the Cloud 825, for example at a Cloud server, provides and/or updates configuration information 822 to govern the determination at block 820. Such configuration information may, for example, be stored in a memory of the Network Probe (e.g., if separate from the node), may be stored in a memory of a node to which the Network Probe is connected (or is an internal module of), etc. Block 820 may then, for example, retrieve (or get) the configuration information as needed. Such retrieval may, for example, comprise a direct memory access, communicating a request for the configuration information to another device, etc.

If, at block 720, it is determined that various characteristics of the event (or network operation) will be measured, then execution flow of the example method 700 proceeds to block 730. At block 730, various characteristics associated with the event (or network operation) are measured/monitored, many examples of which are provided herein (e.g., messages, signals, etc.).

As a specific handover example, as shown in the example method 800 of FIG. 8, at block 820 the example method 800 may comprise measuring/monitoring the wireless technology(s) or signals involved in the handover, current and/or next hop count, handover time, success or failure of the handover, whether any packets were lost and/or retransmitted in the communication between various nodes (e.g., between a Mobile AP and an MC (or network controller) or LMA, etc.), whether a call or session was dropped, etc.).

Block 740 may, for example if configured to do so by the configuration parameters, comprise processing various measurements to determine metrics. For example, block 740 may comprise determining whether an event (or network operation) was performed successfully, how long an event (or network operation) took to complete, whether an operation was performed within a desired time, error rate, data rate, signal quality characteristics, etc.

As a specific example, block 840 of the example method 800 of FIG. 8 may comprise calculating or estimating handover time (e.g., based at least in part on a lost packet count, time between probing packets, etc.), determining whether the handover was concluded within an acceptable amount of time, determining whether the handover was not possible for a particular AP, identifying a reasons for a handover failure or a handover that took too long to complete, etc.

At block 750, the example method 700 may comprise forming one or more reporting messages (e.g., one or more messages reporting measurements, metrics, identified issues, etc.). Block 750 may comprise forming the reporting messages in any of a variety of manners, non-limiting example of which are provided herein. For example, block 750 may comprise forming one or more reporting messages based on a format indicated in the downloaded configuration information discussed herein, forming such reporting messages based on a default format in the absence of specific configuration information, etc.

As part of the functionality performed at block 750, the example method 700 may comprise determining whether a reporting message is to be formed at all. For example, in a scenario in which configuration information (or default program instructions) indicates that only reporting messages regarding event (or network operation) failures or poor performance are to be communicated, block 750 may comprise determining to refrain from forming a reporting message in a scenario in which the measured or monitored operation was found to be normal. Continuing the example, in a scenario in which an error occurs or network operation outside the bounds of normal behavior is calculated, block 750 may comprise forming a reporting message.

Block 750 may also comprise determining the manner in which the formed reporting messages are to be communicated (e.g., message communication strategy). For example, block 750 may comprise determining whether to communicate a formed reporting message in a real-time manner (e.g., in a fastest manner available), whether to communicate a formed reporting message in a bounded delay-tolerant manner (e.g., with guaranteed delivery within a maximum time limit), in a purely opportunistic delay-tolerant manner (e.g., whenever a cheapest available delivery method is available), etc. Block 750 may comprise making such a determination in any of a variety of manners, for example based on the configuration information discussed herein, based on default reporting instructions, based on measuring or monitoring results, etc. Block 750 may, for example, comprise making the communication strategy decision based on results of the measurement or monitoring activity. For example, block 750 may comprise determining to communicate a reporting message containing results from a passed test in a delay-tolerant manner, and determining to communicate the reporting message containing results from a failed test in a real-time manner. Also for example, block 750 may comprise determining to communicate one or more reporting messages in a result mandated by the configuration information.

Note that a monitored or measured event may result in the generation of multiple reports, and each report may be independently associated with a respective communication strategy. For example, in an error scenario (or a scenario in which unexpected behavior or operational difficulty is detected), block 750 may comprise determining to communicate a first message in real-time (e.g., utilizing a cellular communication link, utilizing a plurality of alternative communication pathways, etc.) to a destination, for example to notify a network controller of a network failure (or a potential network problem) as quickly as possible. Continuing the example scenario, block 750 may also comprise determining to communicate a second message in a delay-tolerant manner (e.g., one or more longer messages including a substantial amount of detail that may be analyzed at a later time, for example in post mortem analysis, that may be communicated in a cheapest manner, that may be communicated in a manner that will not impact current network performance, etc.).

As a specific example, block 850 of the example method 800 shown in FIG. 8 may comprise forming a handover reporting message in a default manner (e.g., unless configuration information indicates that the handover reporting message should be formed in a non-default or other manner), determining to communicate the handover reporting message in a real-time communication manner if the handover fails, and determining to communicate the handover reporting message in a delay-tolerant manner (or not at all) if the network performs the handover operation as expected.

After execution of block 750, execution flow of the example method 700 proceeds to block 760, at which one or more reporting messages concerning the measuring or monitoring activity are communicated to a destination (e.g., to a network controller, central controller, Cloud server, etc.). Block 760 may, for example, communicate the one or more reporting messages in accordance with the communication strategy determined at block 750. For example, block 760 may comprise communicating urgent (or high-priority) reporting messages in real-time over a cellular communication link, through a communication pathway of a vehicle network that is known to be fast and reliable, etc. Also for example, block 760 may comprise communicating non-urgent (or low-priority) reporting messages in a delay-tolerant manner over the vehicle network when bandwidth utilization is relatively low, through a stationary hotspot being passed by a vehicle of the node being monitored, etc.).

As a specific example, referring to the example method 800 of FIG. 8, if block 850 determines to communicate the measuring or monitoring results (or a portion thereof) in real-time, then execution flow of the example method 800 may proceed to block 862 for the communication of such results in real-time. Also, if block 850 determines to communicate the results (or a portion thereof) in a delay-tolerant manner, then execution flow of the example method 800 may proceed to block 861 for the communication of such results in a delay-tolerant manner.

At block 795 (or 895), operation of the example method 700 (or 800) may continue, for example looping back to any previous block of the method 700, continuing to another block or function discussed herein, etc.

In accordance with various aspects of the present disclosure, the monitoring and/or performance evaluation mechanisms (e.g., metrics calculation, anomaly identification, etc.) are scalable. In turn, the utilization of such mechanisms enhances the scalability of the overall network, for example providing for measuring/monitoring network operation as the network increases in size.

Various aspects of the present disclosure concern the measuring/monitoring of network performance characteristics. Such measurements may be performed in any of a variety of manners. For example, such measurements may be performed utilizing modules (e.g., hardware and/or software modules, etc.) integrated into the node making the measurements. Also for example, sensors, testers, and/or other devices outside of the node may be utilized. Such devices may, for example, be communicatively coupled to the node and/or may even be powered by the node. In accordance with various aspects of the present disclosure, a portable Network Probe device is provided that may, for example, monitor various aspects of the communication environment of an access point (e.g., a Fixed AP, a Mobile AP or OBU, etc.) or other network node.

Figure 9:
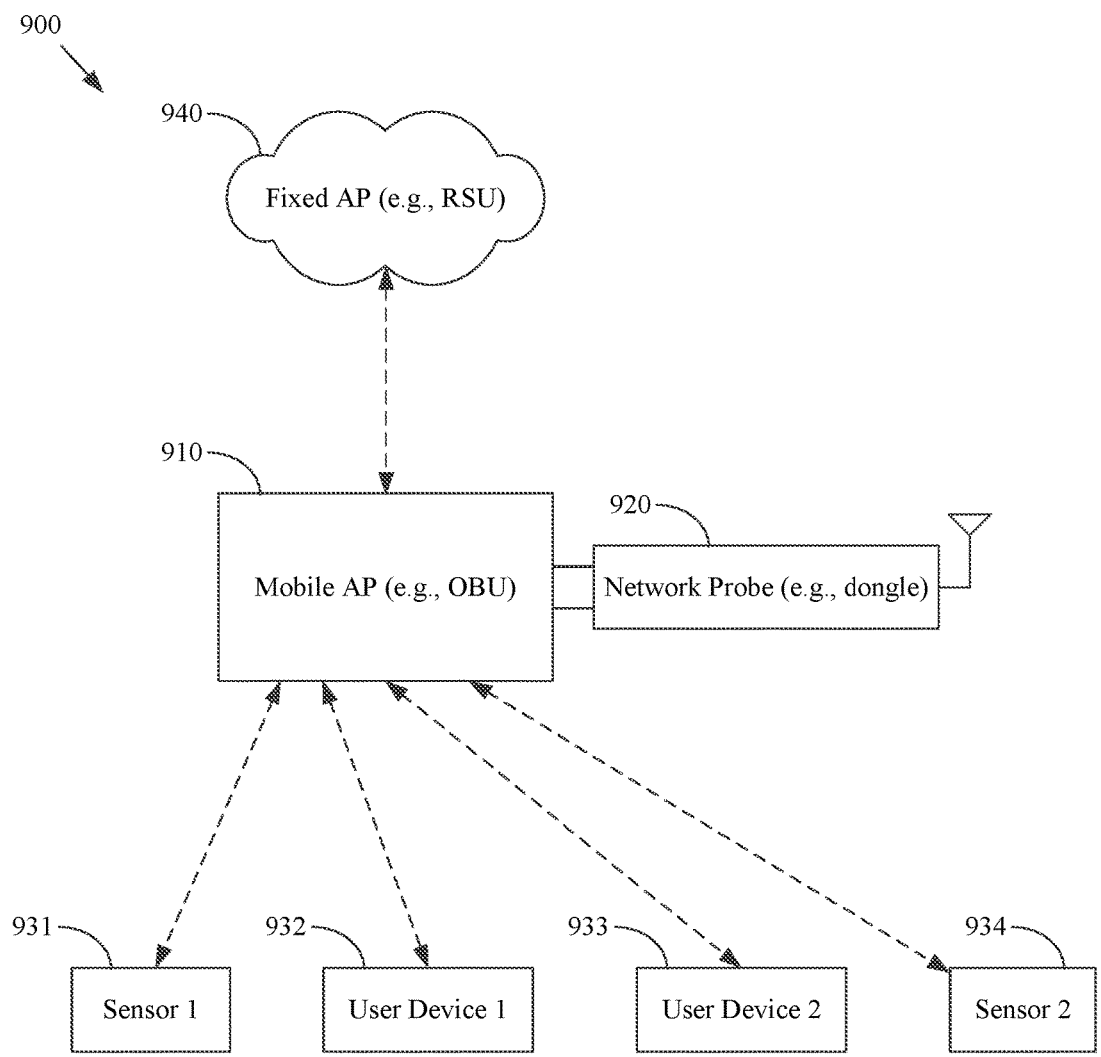
FIG. 9 shows an example network environment in which a Network Probe is connected to a Mobile AP, in accordance with various aspects of the present disclosure.

FIG. 9 shows an example network environment 900 in which a Network Probe 920 (e.g., a USB dongle, insertable card or module, chip, etc.) is connected to a Mobile AP 910 (e.g., an OBU, etc.) or other node. The network environment 900 shown in FIG. 9 (or any portion thereof) may, for example, be implemented in any or all vehicles of a vehicle network (e.g., any vehicle network as discussed herein, etc.). The example network environment 900 may, for example, share any or all characteristics with the other example networks and/or network components 100, 200, 300, 400, 500-570, 600, 700, 800, 1000, and 1100, discussed herein.

The example Network Probe 920 may, for example, comprise the form factor of a USB dongle or thumb drive plugged into a USB port of the Mobile AP 910. In such a way, the Network Probe 920 may communicate information with the Mobile AP 910 via the USB bus and/or may receive electrical power from the Mobile AP 910 via the USB bus. Also for example, the Network Probe 920 may be coupled to an Ethernet port of the Mobile AP 910. The scope of the present disclosure is not limited to any particular manner in which a Network Probe 920 may be connected to a Mobile AP 910 (or other node).

The example Mobile AP 910 may, for example, be communicatively coupled to an example Fixed AP 940 via a wireless link (e.g., an 802.11p link, cellular link, etc.). The Mobile AP 910 may also, for example, be communicatively coupled to a first Sensor 931, first User Device 932, second User Device 933, and second Sensor 934 via respective wireless links (e.g., 802.11a/b/g/b links, Bluetooth links, etc.). The Mobile AP 910 may, for example, comprise one or more communication interface modules that operate to maintain such communicative couplings.

The Network Probe 920 may, for example, comprise a small computer or processor system and a USB interface (and/or other wired or tethered optical interface, for example an Ethernet interface, etc.). The Network Probe 920 may also, for example, comprise one or more wireless receivers or transceivers (e.g., for Wi-Fi, for DSRC, for cellular, for a PAN like Bluetooth, etc.) and corresponding antennas. An example block diagram of a Network Probe 1000 is provided at FIG. 10 and discussed herein.

The Network Probe 920 may, for example, operate in a passive mode, for example monitoring communications (e.g., user communications, control communications, etc.) in the vehicle network and/or assessing the quality of service provided to the user. The manner in which the Network Probe 920 monitors the network environment may, for example, depend on the service(s) being provided in the network (e.g., VoIP services, web browsing services, sensor data gathering services, vehicle control services, navigational services, communication relaying services for a peer node or other node, etc.). For example, the Network Probe 920 may operate to monitor and/or evaluate data rate, packet error rate or retransmission rate, signal strength, noise level, S/N ratio, number of users, number of active communication sessions, network operation performance times, operational failures, etc. The Network Probe 920 may also, for example, operate to monitor noise in the vehicle network environment.

A vehicle may, for example, be equipped with a Mobile AP 910 and a Network Probe 920 (e.g., always or only when a test or study or analysis is being performed). The Network Probe 920 may, for example, operate to monitor the general communication environment (e.g., RF environment, etc.) within and/or near the vehicle and report the results (e.g., to a server of the Cloud, to a Network Operations Controller, to a client server, to a user device, etc.).

As discussed herein with regard to other example systems, the Network Probe 820 may operate to communicate measurement/monitoring information and/or metric information to a destination node via a cellular link, directly to the Fixed AP 840 or to other node via the Fixed AP 840, to the Fixed AP via the port and wireless interface of the Mobile AP 810, etc.

The Network Probe 920 may, for example, be powered by the Mobile AP 910. For example, the Network Probe 920 may receive power from the Mobile AP 910 via a port (e.g., USB port, Ethernet port, etc.) to which the Network Probe 920 is connected. The Network Probe 920 may also have an internal power supply (e.g., a rechargeable battery, etc.).

The Mobile AP 910 (or other node, for example a Network Controller, central server, etc.) may, for example, control various operational aspects of the Network Probe 920. For example, the Mobile AP 910 may configure the Network Probe 920, or for example a Cloud entity may configure the Network Probe 920 via the Fixed AP 940 and the Mobile AP 910, as discussed herein, or for example a Cloud entity may configure the Network Probe 920 via a cellular link (or other backbone link) and bypass the vehicle network.

The Network Probe 920 may, for example, be configurable to control the network monitoring behavior of the Network Probe 920. For example, another node may configure the Network Probe 920 to periodically perform monitoring (e.g., specifying measurements and periodicity, etc.), to perform monitoring on a time schedule (e.g., specifying measurements and times, etc.), to perform monitoring immediately and/or to stop monitoring immediately (e.g., specifying measurements to perform or stop performing, etc.), to perform monitoring in response to various triggering conditions, etc.

The Mobile AP 910 may, for example, operate to control power-save modes of operation of the Network Probe 920. For example, the Mobile AP 910 may manage waking the Network Probe 920 from a sleep state when a network assessment is desired and/or returning the Network Probe 920 to a sleep state when the network assessment has been completed. Also for example, the Network Probe 920 may be configured to wake and sleep on a timed schedule, as a function of detected network traffic (e.g., as detected by the Mobile AP 920, etc.). Similarly, a Cloud application may operate to control the Network Probe 920 operation through the Mobile AP 910 or directly via other communication links (e.g., via a cellular link, etc.).

In an example implementation, the Network Probe 920 may be utilized to perform a time-based diagnosis of network health, for example without any direct human interaction. For example, in the Cloud an automated mechanism or process (e.g., a network monitoring process running on a server in the Cloud) may be evaluating the network performance as a whole and also per vehicle, taking into account the real time metrics, such as traffic counts, number of Internet sessions, number of users, total bandwidth utilization, etc. If such mechanism or process senses that a problem may be occurring in a particular vehicle (or network thereof), the mechanism or process can automatically activate the Network Probe 920 and monitor the vehicle network activity.

Note that the Network Probe 920 may perform passive monitoring, but may also perform active testing, for example establishing wireless and/or wired connections and communicating test (or probe) packets (e.g., data packets to monitor throughput, control packets to illicit particular operational behaviors for example in the Mobile AP 910, etc.). A suite of test activities may, for example, be programmed into a test configuration controlled from the Cloud.

As discussed herein, the operation of the Network Probe 920 may be controlled by a network monitoring and/or network diagnosis tool implemented in the Cloud. Such tool may, for example, request (or command) any Network Probe for an immediate diagnosis if needed. For example, the tool may request such a diagnosis based, at least in part, on real-time metrics from the whole network (e.g., regarding number of users, number of Internet sessions, traffic counters, etc.) or from a subset of one or more vehicles (e.g., based on the same types of metrics). The tool may, for example, be customized in accordance with client requirements.

Though the Network Probe 920 has been presented as monitoring the network behavior and/or environment at the vehicle network (e.g., a Wi-Fi network of a vehicle), the Network Probe 920 may also operate to monitor and/or test the 802.11p (or DSRC) operation (e.g., between the Mobile AP 910 and the Fixed AP 940), cellular operation (e.g., between the Mobile AP 910 and a cellular network), etc.

Though the Network Probe 920 is shown having a form factor like that of a USB dongle, the scope of this disclosure is not limited thereto. For example, the Network Probe 920 may comprise the form factor of an insertable module, insertable chip or application-specific integrated circuit (ASIC), a combination of a processor and software (or firmware) instructions stored in a memory (e.g., a non-transitory memory) of a network node (or plurality thereof), etc. The Network Probe 920 may, for example, be an integral part of an AP (e.g., a Mobile AP, Fixed AP, etc.) or other network node being monitored or may be a separate independent component. The Network Probe 920 may, for example, be implemented on a smart phone, a notebook or laptop computer, etc. The Network Probe 920 may comprise any of a variety of architectures, a non-limiting example of which is shown at FIG. 10.

Figure 10:
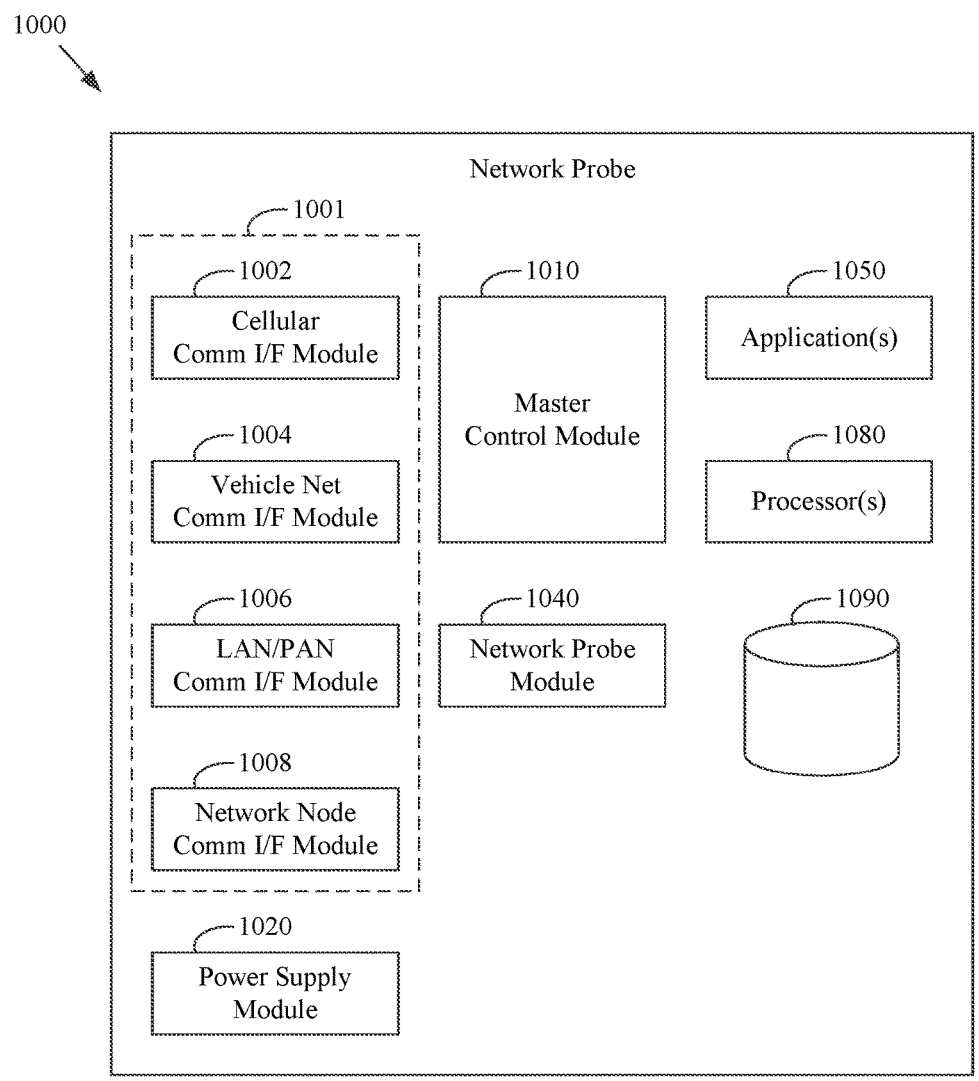
FIG. 10 shows a block diagram of an example Network Probe, in accordance with various aspects of the present disclosure.

FIG. 10 shows a block diagram of various components of an example Network Probe 1000, in accordance with various aspects of the present disclosure. The example Network Probe 1000 may, for example, share any or all characteristics with the other example methods, networks, and/or network components 100, 200, 300, 400, 500-570, 600, 700, 800, 900, and 1100 discussed herein. For example, any or all of the components of the example probe 1000 may perform any or all of the method steps presented herein. For example, the example probe 1000 may, for example, share any or all characteristics with the example Network Probe 920 of FIG. 9. Also for example, the example Network Probe 1000 may, for example, perform any or all of the functionality discussed herein with regard to the example methods 700 and 800 of FIGS. 7 and 8.

The example Network Probe 1000 may comprise a variety of components (or modules), non-limiting examples of which are provided herein.

The example Network Probe 1000 may, for example, comprise a Communication Interface (I/F) Module 1001 (e.g., including a Cellular Communication Interface Module 1002, Vehicle (or mobile) Network Communication Interface Module 1004, User/Client communication interface module 1006 (e.g., LAN, PAN, etc.), Node Communication Interface Module 1008, etc.) that operates to perform any or all of the wireless and/or wired communication functionality for the example Network Probe 1000, many examples of which are provided herein (e.g., communication with sensors external to the Network Probe 1000, communication with a Mobile AP or other node in which the example Network Probe 1000 is installed and/or to which the example Network Probe 1000 is connected, communication with Mobile APs and Fixed APs, communication with Network Controllers, communication with client devices, backhaul communication, Cloud server communication, etc.). The Communication Interface (I/F) Module 1001 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, USB, Ethernet, etc. As discussed herein, the Network Probe 1000 may comprise capability to transmit and/or receive in accordance with one or more communication protocols, via one or more respective communication networks, either sequentially and/or simultaneously.

In an example implementation, the Node Communication Interface Module 1008 may operate to communicate with another device (e.g., an access point, a Mobile AP, a Fixed AP, base station, etc.) via one or more wired ports (e.g., a USB port, an Ethernet port, card socket, a PCMCIA socket, etc.). The wired port may, for example, be external or internal to the node (or device) into which the Network Probe is plugged. Note that such communication may also be wireless.

The example Network Probe 1000 may, for example, comprise a Power Supply Module 1020. The Power Supply Module 1020 may, for example, operate to manage electrical power for the Network Probe 1000. For example, the Power Supply Module 920 may operate to receive and/or condition electrical power from a port (e.g., a USB port, Ethernet port, etc.) to which the Network Probe 1000 is connected. Also for example, the Power Supply Module 1020 may manage utilization and/or charging of an on-board battery if present. As discussed herein, various modules of the Network Probe 1000 may manage power-save operation. As such, the various modules may interface with the Power Supply Module 1020 to control various aspects of power-save operation.

The example Network Probe 1000 may, for example, comprise a Network Probe Module 1040 (NPM) that operates to perform any or all of the Network Probe functionality (e.g., measuring, monitoring, testing, metric calculating, metric analyzing, report forming, report communicating, etc.) discussed herein. The example NPM 1040 may, for example, comprise hardware and/or software that operate to implement any or all of the functionality discussed herein with regard to the example method 700 of FIG. 7, the example method 800 of FIG. 8, the example Network Probe 920 of FIG. 9, etc.

In an example implementation, the NPM 1040 may utilize the Communication I/F Module(s) 1001 to perform passive and/or active wireless testing or monitoring. Also for example, the NPM 1040 may utilize the Node Communication I/F Module(s) 1008 to communicate control and/or monitor/test information with a node to which the Network Probe 1000 is connected.

The NPM 1040 may, for example, operate to manage and/or operate the Network Probe 1000 in accordance with a configuration profile (e.g., stored in the memory 1090, etc.). As discussed herein, the Network Probe 1000 may be configurable (e.g., via the Mobile AP or other node (or device) to which the Network Probe 1000 is connected, via an interface to a user device like a portable tester or smart phone, via a user interface accessible to a user on its housing, etc.). The configuration may, for example, specify monitoring/testing activity and may also manage communication activity. For example, the configuration may specify when and/or how information of the monitored activity is to be communicated (e.g., in real-time, in a delay-tolerant manner, at specified times, etc.). The NPM 1040 may, for example, operate to perform any or all of the probe configuration functionality discussed herein. For example, the NPM 1040 may provide an application program interface or other interface by which other applications and/or users may configure operation of the Network Probe 1000.

The example Network Probe 1000 may, for example, comprise a Master Control Module 1010 that generally manages operation of the Network Probe 1000 at a high level. Such Master Control Module 1010 may, for example, comprise various aspects of an operating system for the Network Probe 1000.

The example Network Probe 1000 may further, for example, comprise one or more applications 1050 executing on the Network Probe 1000 (e.g., node interface applications, network interface applications, user interface applications, etc.).

The example Network Probe 1000 may also comprise one or more Processors 1080 and Memory Devices 1090. The Processor(s) 1080 may, for example, comprise any of a variety of processor characteristics. For example, the Processor(s) 1080 may comprise one or more of a general purpose processor, RIS processor, microcontroller, ASIC, DSP, video processor, etc.). The Processor(s) 1080 may, for example, operate in accordance with software instructions stored in the Memory Device(s) 1090 to perform any or all of the functionality (e.g., network probe functionality, etc.) discussed herein. For example, the various modules discussed herein, though shown separate from the Processor(s) 1080 for illustrative clarity, may be implemented by the Processor(s) 1080 and/or portions of such modules may be implemented by the Processor(s) 1080.

The Memory Device(s) 1090 may, for example comprise any of a variety of memory characteristics. For example, the Memory Device(s) 1090 may comprise a volatile memory, non-volatile memory, etc. As discussed herein, the Memory Device(s) 1090 may comprise a non-transitory computer-readable medium that comprises software instructions that when executed by the Processor(s) 1080, cause the Network Probe 1000 to perform any or all of the functionality discussed herein (e.g., with regard to the example methods discussed herein, etc.). The Memory Device(s) 1090 may also, for example, store any or all of the configuration information discussed herein, any or all of the measuring or monitoring results discussed herein, any or all of the metrics discussed herein, etc.

As discussed herein, various aspects of the present disclosure may be performed in the Cloud (e.g., at a Cloud server, database, etc.). Various example aspects of the Cloud are provided herein (e.g., as shown in FIG. 1, etc.). Another example is provided in FIG. 11, which shows a block diagram of an example Cloud and coupled networks, in accordance with various aspects of the present disclosure.

Figure 11:
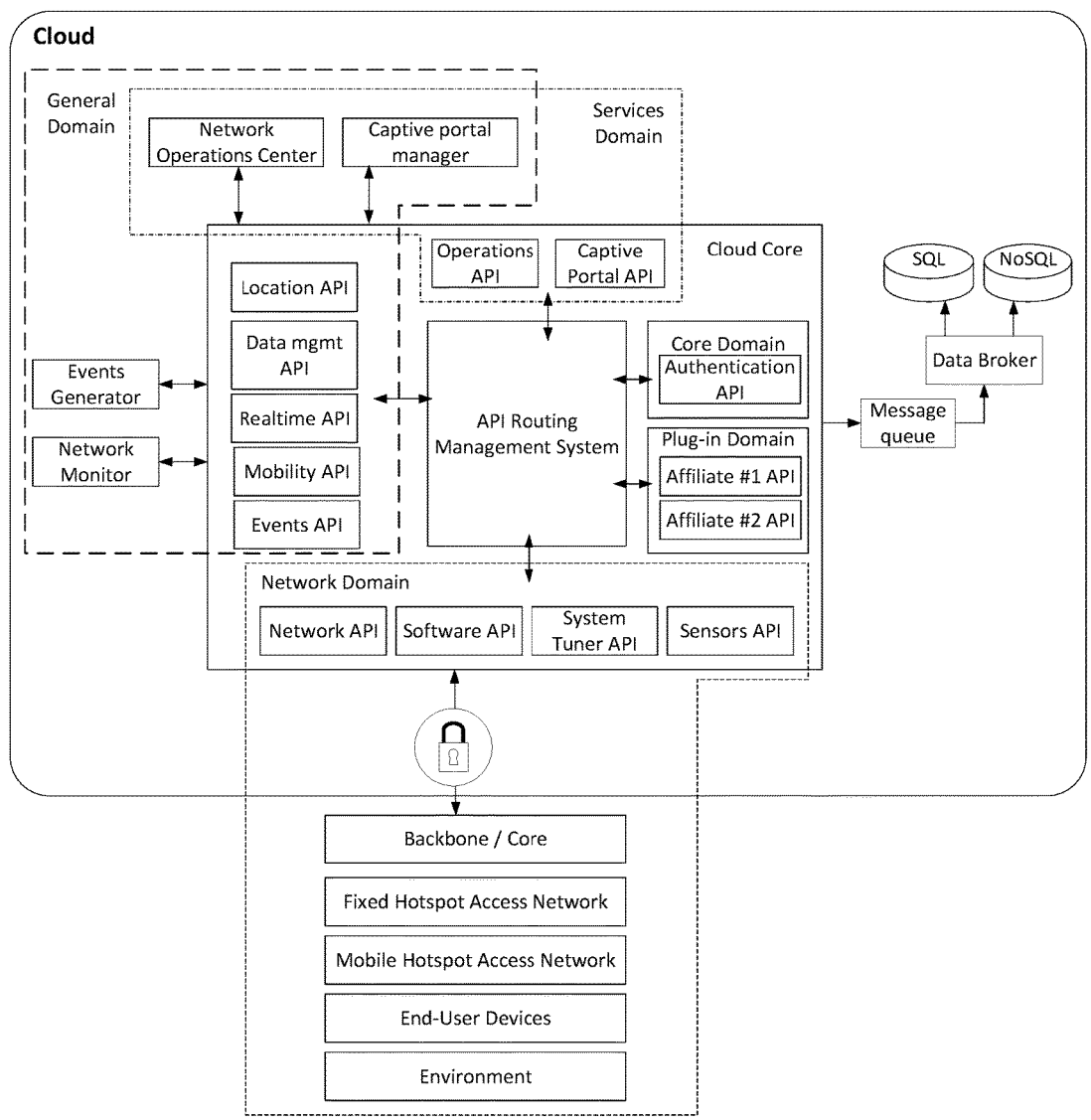
FIG. 11 shows a block diagram of an example Cloud and coupled networks, in accordance with various aspects of the present disclosure.

FIG. 11 shows an example implementation of the Cloud of FIG. 1 or any other example Cloud shown or discussed herein. The example Cloud 1100 may, for example, share any or all characteristics with the other example networks and/or network components 100, 200, 300, 400, 500-570, 600, 700, 800, 900, and 1000, discussed herein.

The example Cloud 1100 comprises circuitry operable to perform a variety of functions and provide a variety of services. The Cloud 1100 comprises circuitry for implementing a network operations center, a captive portal manager, an events generator, a network monitor, a message queue, a data broker, and one or more databases.

The network operations center is operable to provide one or more dashboards via which logged-in users can manage and/or monitor data and services to which they have access (based on their credentials, etc.).

The captive portal manager is operable to provide a captive portal which handles tasks such as including getting user credentials, validating user permissions, displaying context-aware content, and others. The captive portal is further described below.

The events generator is operable to trigger/generate events upon detecting conditions/data/etc. that a client has selected to generate an event. For example, an event may be generated upon detection of reconfiguration of a network component, receipt of particular type of traffic, volume of traffic, number of users, users in a particular location, etc. An event being generated may result in a log being updated, an alert being sent to the client, etc.

The network monitor is operable to monitor/analyze conditions in the network 100, data being generated in the network 100, etc. and generate statistics, breakdowns, reports, etc. based on the analysis The message queue comprises memory operable to queue data for later processing. The queue may be logically portioned into a plurality of queues each of which holds traffic of a particular type/having particular characteristics/etc.

The data broker acts as an intermediary between the databases and the message queue to determine which data to store to which database, which data to read from which database, etc. The data broker may use various QoS/prioritization rules for determining which queue to service at which time.

The database(s) may comprise relational and/or non-relational databases for storing data received by and generated in the network 100.

The Cloud core of the Cloud 1100 comprises circuitry operable to provide a plurality of APIs and an API routing management system for interconnecting the APIs.

The network 100 provides a variety of services and products to its clients and users, based on data exchanges. The network 100 provides internet connectivity, disseminates information through a mesh of connected devices, collects metrics from several other devices that can range from in-board sensors to city-wide scattered devices, and so forth. Every service provided by fixed and mobile access points of the network 100 may generate and consume data of various types, sizes, urgencies, etc. The data therefore needs to be stored and served in a reliable manner. In some implementations, data "closes the loop" in some workflows performed in the Cloud 1100 and/or in other devices of the network 100, and may drive decisions regarding the operations performed in the Cloud 1100 and/or in other devices of the network 100. The data provides snapshots of the overall state of the network 100 by, for example, showing which nodes are online and which are not, by providing traffic and geo-referenced information which are a source of valuable information to the operator(s) of the Cloud 1100 and/or other components of the network 100. It is based on a better knowledge of traffic patterns in specific regions that the Operator(s) of the network is/are able to smartly decide, for example, the best spots to deploy and configure fixed access points, which greatly improve the QoS in the area it covers.

As more and more devices connect to the network 100, it is beneficial that the Cloud 1100 infrastructure is scalable enough to meet the data processing and storage demands. Accordingly, aspects of this disclosure ensure high availability of the database(s) of the Cloud 1100, as well as durability and consistency of the data that is produced by the network 100. Aspects of this disclosure also provide for computation over incoming and outgoing data, which is used to provide real-time reports based on a constantly increasing number of metrics. With the increasing volume of data, storage limits are also a concern. Accordingly, aspects of this disclosure provide for dynamically increasing the size of the volumes assigned to data storage using Logical-Volume-Management.

In an example implementation, the Cloud 1100 comprises a plurality of virtual machines hosting both relational and non-relational databases (e.g., based in MySQL 5.6 and MongoDB 3.0, respectively). Both databases are configured to be accessible by a subset of virtual machines that are configured in the same virtual private network, as to ensure data security. All the requests to each of the databases may, for example, be performed by issuing such requests to this subset of virtual machines. The databases are configured as clusters of servers geographically scattered, where each location holds an integral copy of the data, and a load balancing device is configured to forward the requests to the nearest replica, thus reducing the latency of the communication.

In an example implementation, the Cloud 1100 takes advantage of non-relational databases to reduce burden resulting from performing computationally-intensive data processing. In an example implementation, the architecture of the Cloud 1100 ensures the databases do not become a critical bottleneck and that the API routing/management system (the entry point for all the nodes to the Cloud 1100 infrastructure) is not overloaded with database requests. In an example implementation, the architecture of the Cloud 1100 ensures high availability, consistency and durability of the data. In an example implementation, the architecture of the Cloud 1100 enables analyzing data and retrieving data analytics in a very short period of time (e.g., less than hundreds of milliseconds) for any time range. In an example implementation, the architecture of the Cloud 1100 isolates data processing from data collection. The Cloud 1100 may comprise requires redundant servers that are able to step up as master/primary members of both MySQL and NoSQL clusters. Drives assigned to storage of data for the Cloud 500 may be dynamically increasable. The Cloud 1100 may be such that MySQL and NoSQL databases are accessible by a limited number of nodes, and may require all requests from third-parties to be via a determined API.

In an example implementation, each vehicular network relies on a cluster of virtual machines that host databases, where each cluster is composed of at least two MySQL servers (one master, one slave), and at least three NoSQL servers (one primary, one secondary, one arbiter). In an example implementation, both the MySQL and NoSQL clusters of machines host one running instance per vehicular network. In MySQL, the data regarding each client within the same vehicular network is saved in an independent database. On the other side, the data that is stored in MongoDB is saved in the same database. The suggested configuration ensures availability and replication of data across servers in distinct availability zones. Moreover, the MongoDB replication core allows one to transparently manage its configuration, by ensuring that there is at least one accessible primary, available for both read and write operations.

In an example implementation, one or more NoSQL databases are used as an aggregation framework. Whereas the MySQL database(s) store(s) data as it arrives from the network, the NoSQL database(s) is/are used to store data that has been previously processed. Therefore, it is lighter to load data in real-time when some of the processing has been previously done. This is particularly useful when it comes to downloading large chunks of data to display in some graphical interface, and where fast loading times leverage the usability. Each network may store non-relational data in MongoDB in a database, which collects metrics regarding a variety of parameters. Example parameters include:

network performance: reports for each node, aggregated in any desired intervals such as hours, days and weeks. Each document may, for example, report the traffic generated by each node within that time range, as well as the total distance travelled, motion behavior, and connectivity. In an example implementation, OBUs, sensors, and/or other kinds of nodes contribute to this collection. In an example implementation, LMAs and RSUs do not contribute to this collection but have separate reports, as discussed next.

LMA performance: reports for each LMA, aggregated in any desired interval(s). Each document reports the traffic generated by each LMA within that time range.

RSU performance: reports for each RSU, aggregated in any desired interval(s). Each document reports the traffic generated by each RSU within that time range.

Region performance: reports for each region, aggregated in desired interval(s). Each document reports the traffic generated by the whole fleet within that time range, as well as the motion behavior, connectivity and RSSI. May also contain city-specific metrics, such as speed, road condition and path. All sorts of regions can be stored into this collection (squares, polygons, circles, etc.).

sessions performance: reports the sessions, aggregated in desired interval(s). Each document may, for example, refer to the number of contributing nodes, total number of distinct macs, sessions, traffic, duration, and number of first-time users.

users: stores a variety of information regarding the users of the network.

device statistics: reports statistical analysis regarding hardware information from the devices that connect to the network.

region definitions: defines a region as a cluster of other regions (i.e., a street is composed by some squares). May also contain the definition of the expected behavior of the nodes in that region (i.e., typical motion pattern).

For each collection, indexing is implemented to ensure performance optimization regarding most metrics. In particular, indexes over clients and timestamps may be implemented in all time-based collections. This may greatly increase the performance when time-based queries are issued, with responses received in less than 500 ms.

Data volume is constantly growing, and rate of growth is often increasing. For this reason, the Cloud may comprise a Logical Volume Management device mapper, which allows data drives to be dynamically increased without rebooting or restarting the database service.

In an example implementation, the Cloud uses a non-relational database architecture that comprises a primary node, a secondary node, and an arbiter node. The primary node and the secondary node may reside in electrically independent data-centers. The primary node is responsible for the writing processes. When the primary fails, the secondary is able to automatically step up as the new primary, and ensure that no data is lost. The process of electing a primary node requires an odd number of voters, the arbiter fulfills this requirement. In an example implementation, the arbiter does not store any data, and is not eligible to become primary. The arbiter may be hosted in a separate virtual machine, although it may share its CPU with other processes. The arbiter may consume next to no CPU resources.

Non-relational database performance may be bounded by its writing performance. Several techniques may be used to improve the overall performance of the non-relational database(s). One such technique is to write many small documents, making aggregation processes faster. Internally, an aggregation operation is transformed into a series of aggregations that are later re-aggregated. Dealing with smaller documents makes such process easier to compute. Another technique where the database implementation allows collection and document-level locking, is to use many collections, which increases the number of indexes, but also their performances (This technique is bounded by the namespace limit, but such limit may be fairly high). Another technique is to avoid growing documents. Since inserting a new document reserves the size that fits its needs, appending elements to arrays inside that document will force it to be moved in the hard drive, thus decreasing the write performance. Another technique is to use field modifiers instead of modifying the whole document. Another technique is to ensure proper indexing. Another technique is to increase RAM and IO capacity. Another technique is to use core sharding in a multi-core machine instead of, or before resorting to, sharding across multiple virtual machines.

In example implementation, for the relational database(s), each server will host one database per client. The database may store metrics regarding the network within a given geographical region and one additional database, which data is shared across multiple instances of Cloud's database infrastructure. The cluster of machines may consist of two elements: one master database per geographical region (e.g., MySQL server that receives all writing operations), and one slave database per geographical region (e.g., MySQL server that replies to read operations). The relational databases may be replicated in a master-slave schema. The cluster consists of two nodes, where the second replicates the operations from the first. In the replication environment, the master (the source of the replication) saves all operations in one file (binary log). All replicas of that master read and reproduce the operations stored in that file, thus ensuring that two distinct servers have the exact same data. Table-level replication is expected and based on the customer's needs, agreements, etc. Replication configuration may be done in the slave, as to avoid downtime in the master database, considering that both master and slave are kept in the premises of the Cloud operator. Additional replicas can be configured, in particular to third-party premises, as long as they replicate from the first slave. The first slave will then act as a master to other slaves, and replication restrictions shall be set there.

Data that is received in the Cloud may vary in many ways (e.g., in length, in whether it comes via a delay-tolerant or non-delay tolerant network, amount of processing it requires, whether it needs to be saved in the database right away, whether processing of it can be done later, and/or the like). In order to handle delay-tolerant data, especially data that requires some heavy processing, the message broker may be configured to use the AMQP framework. In such an implementation, a server running AMQP may receive and store a set of messages in memory, which is faster than saving it in the hard drive, and may process the messages at a later time. The configuration of the Cloud 1100 enables the databases and the message broker to be stored anywhere, including under customer's premises, partially or integrally.

In an example implementation, each metric is assigned a queue in the AMQP process. A queue is a buffer that accumulates messages of a certain kind, based on routing keys. Examples of queues are (1) messages with user(s) traffic (2) messages with events that occurred in the network (3) messages with traffic counters per access point or (4) operational logs for every machine configured in the Cloud 1100.

Besides hosting the AMQP server, the virtual machine may also host the AMQP client, an application that implements one function for each queue. This may provide for having many queues, and provide small functions that parse the content of each queue. Example queue types include:

monitor queues, which collect logs from the several machines. Processing each monitor queue may comprise storing its content in a log file, under one of three categories: informational, warning or error logs.

Network queues, which receive delayed tolerant data from via an API, and store the information in relational database Storage queues, which build non-relational database queries based on the content of the messages, and store them in non-relational database If for some reason the IO resources are not available (i.e., the databases are not reachable or are rejecting requests), the messages are not discarded. Instead, they are placed on the top of the queue, for later reprocessing. Messages that are wrongly formatted, and therefore can't be used to produce valid database insertions, are sent to the monitor queues (the one that corresponds to that specific machine), as error messages.

In an example implementation, use of an analytics oriented non-relational database for aggregation of results into buckets of data leverages data throughput, and increases loading speed.

In an example implementation, the use of document-level locking, instead of collection-level locking, provides higher granularity locking, which promotes higher writing throughput, and higher level of concurrent writes.

In an example implementation, a message queue server separates issues related to the network performance from database storage performance. Heavy, delay-tolerant processing tasks are moved away from the API that is responsible for managing the network, and are thus subject to high performance and real-time constraints.

In an example implementation, logical volume management allows the deployment of instances with smaller storage drives, and allows dynamically increasing drive size according to data growth.

In an example implementation, Logs from the several machines that serve the vehicular network are centralized in one machine.

In an example implementation, the message broker separates relational database insertions from non-relational database insertions in different queues, and provides a guarantee that both will be processed, even if at different instants, even if the execution of the broker is interrupted.

In an example implementation, data is guaranteed high availability for the non-relational database(s). In case the primary replica of the non-relational database fails, the secondary steps up as the new primary. Eventually the former rejoins the cluster as a secondary, and recovers from the point of failure and resumes its normal operation.

In an example implementation, reading requests or the non-relational database are forwarded to the geographically nearest secondary replica, thus ensuring the lowest latency possible.

In an example implementation, reading requests for a relational database are forwarded to the slave replica, thus ensuring that the main server has enough availability to fulfil the write requests.

In an example implementation, the number of non-relational database collections does not grow with the number of clients.

In an example implementation, relational database replication is table-wise such that per-table decisions as to replication can be made to respect different permission levels, levels of service, etc.

In an example implementation, the queue may be prioritized and messages in some queues (e.g., insertion of traffic counters) may have priority in reserving the CPU over others (e.g., saving logs to the hard drive). In this manner, the server can better handle messages that require immediate/real-time actions In an example implementation, some computation can be done by each access point, prior to the data being uploaded to the Cloud. Vehicular nodes may send logs to the message broker via an API endpoint.

In an example implementation, the relational database may be implemented in a multi-master topology based on distinct geographic locations. This enables two users in different locations shall be able to connect to the nearest relational database instance, and write changes to the database, and have such changes propagated to the other nodes.

In an example implementation, location-based sharding may be used for the database(s).

In an example implementation, the network 100 provides vehicular connectivity and analytics to customers with specific requirements, and generates data with different levels of confidentiality and size. Accordingly, data can be organized in such a way that data tables are stored exclusively in their assigned vehicular network database (and its replicas).

In an example implementation, all relational databases (and their replicas) may share the same information for a specific set of tables, where each database replicates its changes to the other databases.

In an example implementation, relational database cluster, comprising a multi-master farm of relational database servers, is configured with no single point of failure and uses geographical replication, where each node replicates writes to other nodes, including automatic resynchronization after failure for self-healing. The relational database cluster may guarantees that, if one node happens to fail, there will always be another node storing the same information. It uses 3 types of nodes:

management nodes, which are responsible for maintaining the cluster up and running, performing backups, rollbacks, etc.

API nodes, which are the gateway for all the data stored in the data nodes. API nodes ensure a seamless connection to the cluster, from the client point of view. Although the data may come from distinct data nodes, the API nodes aggregate them, and display them as one.

data nodes, which contain the data. Data nodes within the same node group replicate the information between themselves, in such a way that all the elements are the primary holders of part of the information, that is, even if a table is replicated into two or more instances of the relational database, some rows are owned by one instance, some by the other. Read requests are split across several machines, as they always seek to query the owner of the information. Different node groups hold distinct pieces of the data.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for monitoring a network of moving things. As non-limiting examples, various aspects of this disclosure provide configurable systems and methods for monitoring various operational characteristics of a network of moving things, determining a reporting strategy for the monitored characteristics, and/or implementing the determined reporting strategy. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A network probe comprising:
a housing;
a port plug configured to connect to a port of a vehicle communication network mobile access point (MAP); and
at least one module comprising a processor and memory in the housing,
wherein the at least one module is operable to, at least:
monitor operation of a monitored MAP to which the port plug is connected;
prepare one or more reports regarding the monitored MAP operation;
determine a manner in which to communicate the one or more reports to a destination by, at least in part:
operating to determine, based at least in part on the monitored MAP operation, whether to communicate the one or more reports in a real-time manner or in a delay-tolerant manner; and
communicate the one or more reports to the destination in the determined manner, wherein:
the at least one module is operable to determine the manner in which to communicate the one or more reports to the destination by, at least in part:
operating to determine, based at least in part on the monitored MAP operation, a respective communication network through which each of the one or more reports is to be communicated; and
the at least one module is operable to determine the respective communication network through which each of the one or more reports is to be communicated by, at least in part, selecting a first communication network if the monitored MAP operation corresponds to a failed test, and selecting a second communication network different from the first communication network if the monitored MAP operation corresponds to a passed test.

2. The network probe of claim 1, wherein:
the one or more reports comprise a plurality of reports corresponding to a same monitored MAP operation; and
the at least one module is operable to independently determine whether each of the plurality of reports is to be communicated in an immediate real-time manner or in a delay tolerant manner.

3. The network probe of claim 1, wherein the delay-tolerant manner comprises a delay-tolerant manner with a maximum time limit.

4. The network probe of claim 1, wherein the at least one module is operable to determine the respective communication network based, at least in part, on configuration information indicating that the network probe is to communicate at least one of the one or more reports through a stationary hotspot being passed by the monitored MAP.

5. The network probe of claim 1, wherein the at least one module is operable to:
calculate a metric based, at least in part, on the monitored MAP operation; and
determine the manner in which to communicate the one or more reports to the destination based at least in part on the calculated metric.

6. A network probe comprising:
a housing;
a plug protruding from the housing and through which electrical connection is established between the network probe and a node of a communication network, the plug configured to plug directly into a port of the node of the communication network; and
at least one module comprising a processor and memory in the housing and operable to, at least:
wait for a triggering event;
determine a monitoring strategy;
monitor network operation in accordance with the determined strategy;
calculate a performance metric based on the monitored network operation;
prepare one or more reports regarding the monitored network operation;
identify, based at least in part on the calculated performance metric, a communication network through which to communicate the prepared one or more reports to a destination; and
communicate the one or more reports to the destination via the identified communication network,
wherein the at least one module is operable to:
determine whether the monitored network operation passed or failed; and
identify the communication network based, at least in part, on whether the monitored network operation passed or failed.

7. The network probe of claim 6, wherein the at least one module is operable to identify the communication network by, at least in part, operating to identify a cellular communication network if the monitored network operation failed.

8. The network probe of claim 6, wherein the plug comprises a USB plug and/or an Ethernet plug.

9. The network probe of claim 6, wherein the plug is pluggable directly into a port of a mobile access point of a vehicle communication network, and is pluggable directly into a port of a fixed access point of a vehicle communication network.

10. The network probe of claim 6, wherein the at least one module is operable to receive a trigger message concerning the triggering event through the plug.

11. The network probe of claim 6, wherein the at least one module is operable to:
receive, from a node being monitored by the network probe, first monitored information from the node through the plug; and
receive from the node being monitored by the network probe, second monitored information from the node wirelessly.

\* \* \* \* \*